US011842422B2

(12) United States Patent
Kuznetsov et al.

(10) Patent No.: US 11,842,422 B2
(45) Date of Patent: Dec. 12, 2023

(54) METHODS AND APPARATUS TO EXTEND A TIMESTAMP RANGE SUPPORTED BY A WATERMARK WITHOUT BREAKING BACKWARDS COMPATIBILITY

(71) Applicant: The Nielsen Company (US), LLC, New York, NY (US)

(72) Inventors: Vladimir Kuznetsov, Ellicott City, MD (US); David Gish, Riverdale, NJ (US); Wendell D. Lynch, East Lansing, MI (US)

(73) Assignee: The Nielsen Company (US), LLC, New York, NY (US)

( * ) Notice: Subject to any disclaimer, the term of this patent is extended or adjusted under 35 U.S.C. 154(b) by 273 days.

(21) Appl. No.: 17/246,239

(22) Filed: Apr. 30, 2021

(65) Prior Publication Data

US 2022/0351324 A1    Nov. 3, 2022

(51) Int. Cl.
  *G06K 9/00* (2022.01)
  *G06T 1/00* (2006.01)
  *H04N 19/467* (2014.01)

(52) U.S. Cl.
  CPC ......... *G06T 1/0085* (2013.01); *H04N 19/467* (2014.11)

(58) Field of Classification Search
  CPC ............... G06T 1/0085; H04N 19/467; H04N 21/2407; H04N 21/8358; H04N 21/8547; G06F 21/16
  See application file for complete search history.

(56) References Cited

U.S. PATENT DOCUMENTS

| 8,416,983 | B1 * | 4/2013 | Joseph | H04N 21/44204 |
| | | | | 705/902 |
| 8,775,741 | B1 * | 7/2014 | de la Iglesia | G06F 12/0862 |
| | | | | 711/204 |
| 10,236,031 | B1 * | 3/2019 | Gurijala | G10L 19/018 |
| 10,448,122 | B1 * | 10/2019 | Kuznetsov | H04N 21/2407 |
| 10,448,123 | B1 * | 10/2019 | Topchy | H04N 21/8352 |
| 2008/0002854 | A1 * | 1/2008 | Tehranchi | H04N 21/8358 |
| | | | | 382/100 |
| 2011/0116679 | A1 | 5/2011 | Nakamura et al. | |

(Continued)

FOREIGN PATENT DOCUMENTS

WO    2020010012    1/2020

OTHER PUBLICATIONS

International Searching Authority, "International Search Report," mailed in connection with International Patent Application No. PCT/US2022/025576 dated Aug. 23, 2022, 5 pages.

(Continued)

*Primary Examiner* — Shervin K Nakhjavan

(57) ABSTRACT

Methods, apparatus, systems and articles of manufacture to extend a timestamp range supported by a watermark without breaking backwards compatibility are disclosed. An example watermark encoder includes a counter to increment symbols of a watermark timestamp and a controller to control the counter to increment the symbols of the watermark timestamp based on a key, the controller to cause the counter to restrict ones of the symbol values to increment over one of a first range of symbol values or a second range of symbol values based on a value of the key, the second range of symbol values different from the first range of symbol values.

17 Claims, 10 Drawing Sheets

(56) References Cited

U.S. PATENT DOCUMENTS

| | | | |
|---|---|---|---|
| 2013/0117570 A1* | 5/2013 | Petrovic | G06T 1/0085 |
| | | | 713/176 |
| 2013/0173627 A1* | 7/2013 | Apte | G06F 16/1748 |
| | | | 707/769 |
| 2014/0074855 A1* | 3/2014 | Zhao | H04N 21/8456 |
| | | | 707/746 |
| 2016/0105730 A1* | 4/2016 | Hunacek | G06T 1/0092 |
| | | | 725/31 |
| 2018/0018748 A1 | 1/2018 | Petrovic et al. | |
| 2018/0076961 A1 | 3/2018 | Leddy et al. | |
| 2018/0336657 A1 | 11/2018 | Nielsen | |
| 2019/0115034 A1* | 4/2019 | Frett | H04N 21/4302 |

OTHER PUBLICATIONS

International Searching Authority, "Written Opinion of the International Searching Authority," mailed in connection with International Patent Application No. PCT/US2022/025576 dated Aug. 23, 2022, 5 pages.

\* cited by examiner

| N | binary | increments from 0s | | increments from 1s | | counted minutes | | system |
|---|---|---|---|---|---|---|---|---|
| 0 | 0000 | 16x15x14x13= | 43680 | 1= | 1 | 43680 x 1= | 43680 | old |
| 1 | 0001 | 16x15x14= | 3360 | 12= | 12 | 3360 x 12= | 40320 | new |
| 2 | 0010 | 16x15x14= | 3360 | 12= | 12 | 3360 x 12= | 40320 | new |
| 3 | 0011 | 16x15= | 240 | 12x11= | 132 | 240 x 132= | 31680 | new |
| 4 | 0100 | 16x15x14= | 3360 | 12= | 12 | 3360 x 12= | 40320 | new |
| 5 | 0101 | 16x15= | 240 | 12x11= | 132 | 240 x 132= | 31680 | new |
| 6 | 0110 | 16x15= | 240 | 12x11= | 132 | 240 x 132= | 31680 | new |
| 7 | 0111 | 16= | 16 | 12x11x10= | 1320 | 16 x 1320= | 21120 | new |
| 8 | 1000 | 16x15x14= | 3360 | 12= | 12 | 3360 x 12= | 40320 | new |
| 9 | 1001 | 16x15= | 240 | 12x11= | 132 | 240 x 132= | 31680 | new |
| 10 | 1010 | 16x15= | 240 | 12x11= | 132 | 240 x 132= | 31680 | new |
| 11 | 1011 | 16= | 16 | 12x11x10= | 1320 | 16 x 1320= | 21120 | new |
| 12 | 1100 | 16x15= | 240 | 12x11= | 132 | 240 x 132= | 31680 | new |
| 13 | 1101 | 16= | 16 | 12x11x10= | 1320 | 16 x 1320= | 21120 | new |
| 14 | 1110 | 16= | 16 | 12x11x10= | 1320 | 16 x 1320= | 21120 | new |
| 15 | 1111 | 1= | 1 | 12x11x10x9= | 11880 | 1 x 11880= | 11880 | new |

Total = 491,400 minutes

FIG. 6

METHODS AND APPARATUS TO EXTEND A TIMESTAMP RANGE SUPPORTED BY A WATERMARK WITHOUT BREAKING BACKWARDS COMPATIBILITY

FIELD OF THE DISCLOSURE

This disclosure relates generally to media watermarking, and, more particularly, to methods and apparatus to extend a timestamp range supported by a watermark with backwards compatibility.

BACKGROUND

Watermarks can be embedded or otherwise included in media to enable additional information to be conveyed with the media. For example, audio watermarks can be embedded or otherwise included in the audio data/signal portion of a media stream, file and/or signal to convey data, such as media identification information, copyright protection information, etc., with the media. Such watermarks enable monitoring of the distribution and/or use of media, such as by detecting watermarks present in television broadcasts, radio broadcasts, streamed multimedia, etc., to identify the particular media being presented to viewers, listeners, users, etc. Such information can be valuable to advertisers, content providers, and the like.

Some watermarks also include timestamps to represent time information associated with the media in which the watermark is embedded. For example, the timestamps can represent a broadcast time indicating when the media was broadcast, an access time indicated when the media was accessed (e.g., downloaded, streamed, etc.), a creation time of the media indicating when the media was created, etc. Such timestamps can be used to associate monitored media with a particular media broadcast, a particular media access, a particular media version, etc.

BRIEF DESCRIPTION OF THE DRAWINGS

FIG. 6 is an example counting scheme that may be used to configure operation of the example encoder of FIGS. 3 and 4 and/or the example decoder of FIG. 7.

The figures are not to scale. Wherever possible, the same reference numbers will be used throughout the drawing(s) and accompanying written description to refer to the same or like parts, elements, etc.

Figure 1:
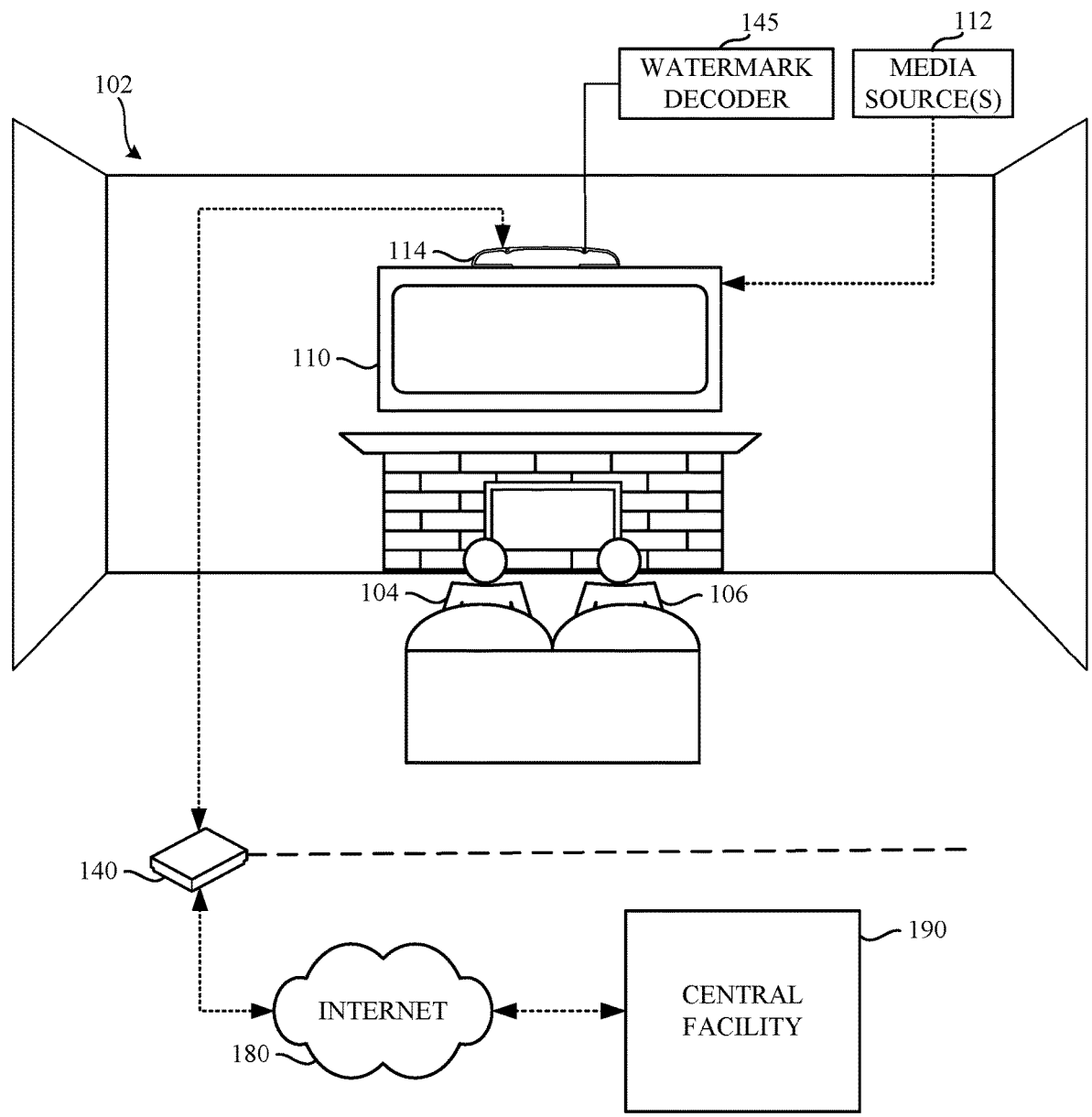
FIG. 1 is a block diagram of an example environment of use including an example media monitoring system structured to extend a time range supported by a watermark in accordance with teachings of this disclosure.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Methods and apparatus to extend a timestamp range supported by a watermark without breaking backward compatibility are disclosed herein. Media watermarking is a technique used to identify media, such as television broadcasts, radio broadcasts, advertisements (television and/or radio), downloaded media, streaming media, prepackaged media, etc. Existing media watermarking techniques identify media by embedding one or more codes (e.g., one or more watermarks), such as media identifying information and/or an identifier that may be mapped to media identifying information, into an audio and/or video component of the media. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are detected/decoded and used to obtain data that can be mapped to media identifying information.

Unlike media monitoring techniques based on codes and/or watermarks embedded or otherwise included in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. Generally, a good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

As noted above, watermarks embedded in media may include timestamps to represent time information associated with the media in which the watermark is embedded. For example, the timestamps can represent a broadcast time indicating when the media was broadcast, an access time indicated when the media was accessed (e.g., downloaded, streamed, etc.), a creation time of the media indicating when the media was created, etc. Such timestamps can be used to associate monitored media with a particular media broadcast, a particular media access, a particular media version, etc.

The time period supported by a watermark timestamp is generally related to the number of symbols of the watermark payload used to represent the timestamp. In examples disclosed herein, a symbol may take on values representing one or more bits. As such, a timestamp supporting a long time period may require a relatively large number of symbols, whereas a timestamp supporting a short time period may require a fewer number of symbols. Thus, for a given payload size, there is a tradeoff between the number of data symbols conveying media identification (and/or other) information, and the number of timestamp symbols, which affects the corresponding time period that can be represented by the timestamp. For example, the Critical Band Encoding Technology (CBET) watermarks of The Nielsen Company (US), LLC., support a time period of substantially (e.g., on the order of) 28 days.

Although the time period supported by a watermark's timestamp may be sufficient for some purposes, such as monitoring presentations of live media broadcasts, such a time period may not be sufficient for other purposes. For example, the prevalence of digital video recorders, video-on-demand services, and other technologies have increased that likelihood that a monitored media presentation may have been time-shifted (e.g., presented at a different time than when the media was broadcast, accessed, etc.). Furthermore, the storage capacities of such technologies continue to increase, resulting in a corresponding increase in the duration of time by which media can be time-shifted. However, if media is time-shifted by a time duration exceeding the time period supported by the timestamp of a watermark embedded in the media, the time represented by the timestamp becomes ambiguous because the number of cycles of the timestamp period occurring from the time represented by the timestamp and the time when the media was presented (and when the watermark was decoded from the media) is unknown. This is because the value of timestamp rolls-over at the end of the timestamp period and, thus, different times separated by multiples of the timestamp period will all have the same timestamp value (similar to how different times separated by a 12-hour period all have the same values on a typical digital alarm clock).

As disclosed herein, a solution to enable a watermark to support a longer duration of time is to increase the total number of timestamp symbols used to represent the watermark timestamp. Disclosed example timestamping techniques achieve this technical solution by increasing the numerical base of the timestamp symbols, while maintaining backwards compatibility. Example timestamping techniques disclosed herein extend the range of a timestamp of a watermark from a first timestamp range (e.g., 28 days or some other value) to a second timestamp range (e.g., 341 days of some value larger than the first range), while still using the same unique timestamp mapping for the original first timestamp range (e.g., the 28-day period) to maintaining backward compatibility.

In an illustrative example, a prior timestamp incrementing scheme maps each minute of a 28-day period to a unique 4-symbol timestamp. The symbol values of the timestamp have a numerical base of base 16 (i.e., values from 0-15), but can alternatively be considered to be of base 28 where the symbol values from 16-27 are not used. To increase the base of each symbol value from base 16 to base 28 for the purpose of extending the range of the timestamp, the values of the timestamp are first incremented through the original first timestamp range in which the symbol values are restricted to increment over the range 0-15 (corresponding to symbol values supported in a base-16 numeric representation). After incrementing through the first timestamp range, the timestamp is incremented through the second timestamp range by restricting one or more of the timestamp symbols to take on symbol values with increment ranges of 16-27 (corresponding to additional symbol values supported by a base-28 numeric representation), while restricting others of the one or more timestamp symbols to take symbols values with increment ranges of 0-15, as illustrated in the timestamp increment key column of FIG. 6 discussed below. In this example, when incrementing over the second timestamp range, at least one of the symbols is restricted to increment over symbol values that are exclusive to the second timestamp range (e.g., 16-27 for base-28) and, thus, not included in first timestamp range (e.g., 0-15 for base-16). By first incrementing using timestamp values restricted to the first timestamp range, and then allowing the timestamp to increment while selectively causing one or more of timestamp symbols to switch between using symbols values restricted to the first range and symbol values restricted to the second range, the overall range of the timestamp is extended while still maintaining the original mapping for the first range.

Figure 7:
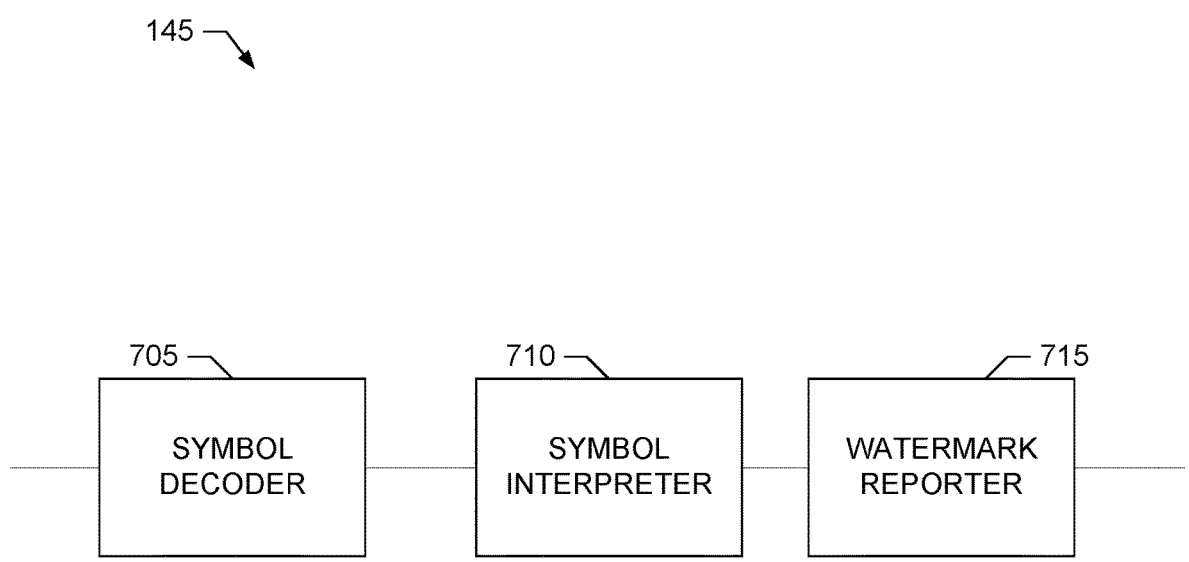
FIG. 7 is a block diagram of an example watermark decoder for use in the example media monitoring system of FIG. 1 and structured to extend a time range supported by a watermark in accordance with teachings of this disclosure.

FIG. 1 is a block diagram of an example environment of use including an example media monitoring system structured to extend a time range supported by a watermark in accordance with teachings of this disclosure. In the illustrated example of FIG. 1, an example media presentation environment 102 includes example panelists 104, 106, an example media presentation device 110 that receives media from an example media source 112, and an example meter 114. The example meter 114 identifies the media presented by the example media presentation device 110 and reports media monitoring information to an example central facility 190 of an example audience measurement entity via an example gateway 140 and an example network 180. In some examples, the meter 114 is referred to as an audience measurement device. In the illustrated example, the meter 114 includes an example watermark decoder 145 structured to extend a time range supported by a watermark in accordance with teachings of this disclosure. An example of the watermark decoder 145 is illustrated in FIG. 7, which is described in further detail below.

In the illustrated example of FIG. 1, the example media presentation environment 102 is a room of a household (e.g., a room in a home of a panelist, such as the home of a "Nielsen family"). In the illustrated example of FIG. 1, the example panelists 104, 106 of the household have been statistically selected to develop media ratings data (e.g., television ratings data) for a population/demographic of interest. People become panelists via, for example, a user interface presented on a media device (e.g., via the media presentation device 110, via a website, etc.). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.). In some examples, an entire family may be enrolled as a household of panelists. That is, while a mother, a father, a son, and a daughter may each be identified as individual panelists, their viewing activities typically occur within the family's household.

In the illustrated example of FIG. 1, one or more panelists 104, 106 of the household have registered with an audience measurement entity (e.g., by agreeing to be a panelist) and have provided their demographic information to the audience measurement entity as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist. While the example media presentation environment 102 is a household in the illustrated example of FIG. 1, the example media presentation environment 102 can additionally or alternatively be any other type(s) of environments such as, for example, a theater, a restaurant, a tavern, a retail location, an arena, etc.

In the illustrated example of FIG. 1, the example media presentation device 110 is a television. However, the example media presentation device 110 can correspond to any type of audio, video and/or multimedia presentation device capable of presenting media audibly and/or visually. In some examples, the media presentation device 110 (e.g., a television) may communicate audio to another media presentation device (e.g., an audio/video receiver) for output by one or more speakers (e.g., surround sound speakers, a sound bar, etc.). As another example, the media presentation device 110 can correspond to a multimedia computer system, a personal digital assistant, a cellular/mobile smartphone, a radio, a home theater system, stored audio and/or video played back from a memory, such as a digital video recorder or a digital versatile disc, a webpage, and/or any other communication device capable of presenting media to an audience (e.g., the panelists 104, 106).

The media presentation device 110 receives media from the media source 112. The media source 112 may be any type of media provider(s), such as, but not limited to, a cable media service provider, a radio frequency (RF) media provider, an Internet based provider (e.g., IPTV), a satellite media service provider, etc., and/or any combination thereof. The media may be radio media, television media, pay per view media, movies, Internet Protocol Television (IPTV), satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc. For example, the media presentation device 110 can correspond to a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. Advertising, such as an advertisement and/or a preview of other programming that is or will be offered by the media source 112, etc., is also typically included in the media.

In examples disclosed herein, an audience measurement entity provides the meter 114 to the panelist 104, 106 (or household of panelists) such that the meter 114 may be installed by the panelist 104, 106 by simply powering the meter 114 and placing the meter 114 in the media presentation environment 102 and/or near the media presentation device 110 (e.g., near a television set). In some examples, more complex installation activities may be performed such as, for example, affixing the meter 114 to the media presentation device 110, electronically connecting the meter 114 to the media presentation device 110, etc. The example meter 114 detects exposure to media and electronically stores monitoring information (e.g., a code detected with the presented media, a signature of the presented media, an identifier of a panelist present at the time of the presentation, a timestamp of the time of the presentation) of the presented media. The stored monitoring information is then transmitted back to the central facility 190 via the gateway 140 and the network 180. While the media monitoring information is transmitted by electronic transmission in the illustrated example of FIG. 1, the media monitoring information may additionally or alternatively be transferred in any other manner, such as, for example, by physically mailing the meter 114, by physically mailing a memory of the meter 114, etc.

The meter 114 of the illustrated example combines audience measurement data and people metering data. For example, audience measurement data is determined by monitoring media output by the media presentation device 110 and/or other media presentation device(s), and audience identification data (also referred to as demographic data, people monitoring data, etc.) is determined from people monitoring data provided to the meter 114. Thus, the example meter 114 provides dual functionality of an audience measurement meter that is to collect audience measurement data, and a people meter that is to collect and/or associate demographic information corresponding to the collected audience measurement data.

For example, the meter 114 of the illustrated example collects media identifying information and/or data (e.g., signature(s), fingerprint(s), watermark(s), code(s), tuned channel identification information, time of exposure information, etc.) and people data (e.g., user identifiers, demographic data associated with audience members, etc.). The media identifying information and the people data can be combined to generate, for example, media exposure data (e.g., ratings data) indicative of amount(s) and/or type(s) of people that were exposed to specific piece(s) of media distributed via the media presentation device 110. To extract media identification data, the meter 114 of the illustrated example of FIG. 1 monitors for watermarks (sometimes referred to as codes) included in the presented media. In examples disclosed herein, a watermark includes a sequence of symbols, with some symbols carrying portions of media-identifying information which, when concatenated into a first symbol sequence, form the media identification, and other symbols carrying portions of a timestamp which, when concatenated into a second symbol sequence, form the timestamp. As disclosed in further detail below, a disclosed example watermark decoder included in the meter 114 is also able to detect an additional timestamp symbol that was applied to or, in other words, used to modify the watermark data symbols and further associate a particular timestamp cycle with the watermark timestamp based on the additional timestamp symbol determined to have been applied to the watermark data symbols.

Depending on the type(s) of metering the meter 114 is to perform, the meter 114 can be physically coupled to the media presentation device 110 or may be configured to capture audio emitted externally by the media presenting device 110 (e.g., free field audio) such that direct physical coupling to the media presenting device 110 is not required. For example, the meter 114 of the illustrated example may employ non-invasive monitoring not involving any physical connection to the media presentation device 110 (e.g., via Bluetooth® connection, WIFI® connection, acoustic sensing via one or more microphone(s) and/or other acoustic sensor(s), etc.) and/or invasive monitoring involving one or more physical connections to the media presentation device 110 (e.g., via USB connection, a High Definition Media Interface (HDMI) connection, an Ethernet cable connection, etc.).

In examples disclosed herein, to monitor media presented by the media presentation device 110, the meter 114 of the illustrated example senses audio (e.g., acoustic signals or ambient audio) output (e.g., emitted) by the media presentation device 110. For example, the meter 114 processes the signals obtained from the media presentation device 110 to detect media and/or source identifying signals (e.g., audio watermarks) embedded in portion(s) (e.g., audio portions) of the media presented by the media presentation device 110. To, for example, sense ambient audio output by the media presentation device 110, the meter 114 of the illustrated example includes an example acoustic sensor (e.g., a microphone). In some examples, the meter 114 may process audio signals obtained from the media presentation device 110 via a direct cable connection to detect media and/or source identifying audio watermarks embedded in such audio signals.

To generate exposure data for the media, identification(s) of media to which the audience is exposed are correlated with people data (e.g., presence information) collected by the meter 114. The meter 114 of the illustrated example collects inputs (e.g., audience identification data) representative of the identities of the audience member(s) (e.g., the panelists 104, 106). In some examples, the meter 114 collects audience identification data by periodically and/or a-periodically prompting audience members in the media presentation environment 102 to identify themselves as present in the audience. In some examples, the meter 114 responds to predetermined events (e.g., when the media presenting device 110 is turned on, a channel is changed, an infrared control signal is detected, etc.) by prompting the audience member(s) to self-identify. The audience identification data and the exposure data can then be compiled with the demographic data collected from audience members such as, for example, the panelists 104, 106 during registration to develop metrics reflecting, for example, the demographic composition of the audience. The demographic data includes, for example, age, gender, income level, educational level, marital status, geographic location, race, etc., of the panelist.

In some examples, the meter 114 may be configured to receive panelist information via an input device such as, for example, a remote control, an Apple® iPad®, a cell phone, etc. In such examples, the meter 114 prompts the audience members to indicate their presence by pressing an appropriate input key on the input device. The meter 114 of the illustrated example may also determine times at which to prompt the audience members to enter information to the meter 114. In some examples, the meter 114 of FIG. 1 supports audio watermarking for people monitoring, which enables the meter 114 to detect the presence of a panelist-identifying metering device in the vicinity (e.g., in the media presentation environment 102) of the media presentation device 110. For example, the acoustic sensor of the meter 114 is able to sense example audio output (e.g., emitted) by an example panelist-identifying metering device, such as, for example, a wristband, a cell phone, etc., that is uniquely associated with a particular panelist. The audio output by the example panelist-identifying metering device may include, for example, one or more audio watermarks to facilitate identification of the panelist-identifying metering device and/or the panelist 104 associated with the panelist-identifying metering device.

The meter 114 of the illustrated example communicates with a remotely located central facility 190 of the audience measurement entity. In the illustrated example of FIG. 1, the example meter 114 communicates with the central facility 190 via a gateway 140 and a network 180. The example meter 114 of FIG. 1 sends media identification data and/or audience identification data to the central facility 190 periodically, a-periodically and/or upon request by the central facility 190.

The example gateway 140 of the illustrated example of FIG. 1 can be implemented by a router that enables the meter 114 and/or other devices in the media presentation environment (e.g., the media presentation device 110) to communicate with the network 180 (e.g., the Internet.)

In some examples, the example gateway 140 facilitates delivery of media from the media source(s) 112 to the media presentation device 110 via the Internet. In some examples, the example gateway 140 includes gateway functionality such as modem capabilities. In some other examples, the example gateway 140 is implemented in two or more devices (e.g., a router, a modem, a switch, a firewall, etc.). The gateway 140 of the illustrated example may communicate with the network 126 via Ethernet, a digital subscriber line (DSL), a telephone line, a coaxial cable, a USB connection, a Bluetooth connection, any wireless connection, etc.

In some examples, the example gateway 140 hosts a Local Area Network (LAN) for the media presentation environment 102. In the illustrated example, the LAN is a wireless local area network (WLAN), and allows the meter 114, the media presentation device 110, etc., to transmit and/or receive data via the Internet. Alternatively, the gateway 140 may be coupled to such a LAN.

The network 180 of the illustrated example can be implemented by a wide area network (WAN) such as the Internet. However, in some examples, local networks may additionally or alternatively be used. Moreover, the example network 180 may be implemented using any type of public or private network such as, but not limited to, the Internet, a telephone network, a local area network (LAN), a cable network, and/or a wireless network, or any combination thereof.

The central facility 190 of the illustrated example is implemented by one or more servers. The central facility 190 processes and stores data received from the meter(s) 114. For example, the example central facility 190 of FIG. 1 combines audience identification data and program identification data from multiple households to generate aggregated media monitoring information. The central facility 190 generates reports for advertisers, program producers and/or other interested parties based on the compiled statistical data. Such reports include extrapolations about the size and demographic composition of audiences of content, channels and/or advertisements based on the demographics and behavior of the monitored panelists.

As noted above, the meter 114 of the illustrated example provides a combination of media metering and people metering. The meter 114 of FIG. 1 includes its own housing, processor, memory and/or software to perform the desired media monitoring and/or people monitoring functions. In some examples, the example meter 114 of FIG. 1 is a stationary device disposed on or near the media presentation device 110. To identify and/or confirm the presence of a panelist present in the media presentation environment 102, the example meter 114 of the illustrated example includes a display. For example, the display provides identification of the panelists 104, 106 present in the media presentation environment 102. For example, in the illustrated example, the meter 114 displays indicia (e.g., illuminated numerical numerals 1, 2, 3, etc.) identifying and/or confirming the presence of the first panelist 104, the second panelist 106, etc. In the illustrated example, the meter 114 is affixed to a top of the media presentation device 110. However, the meter 114 may be affixed to the media presentation device in any other orientation, such as, for example, on a side of the media presentation device 110, on the bottom of the media presentation device 110, and/or may not be affixed to the media presentation device 110. For example, the meter 114 may be placed in a location near the media presentation device 110.

Figure 2:
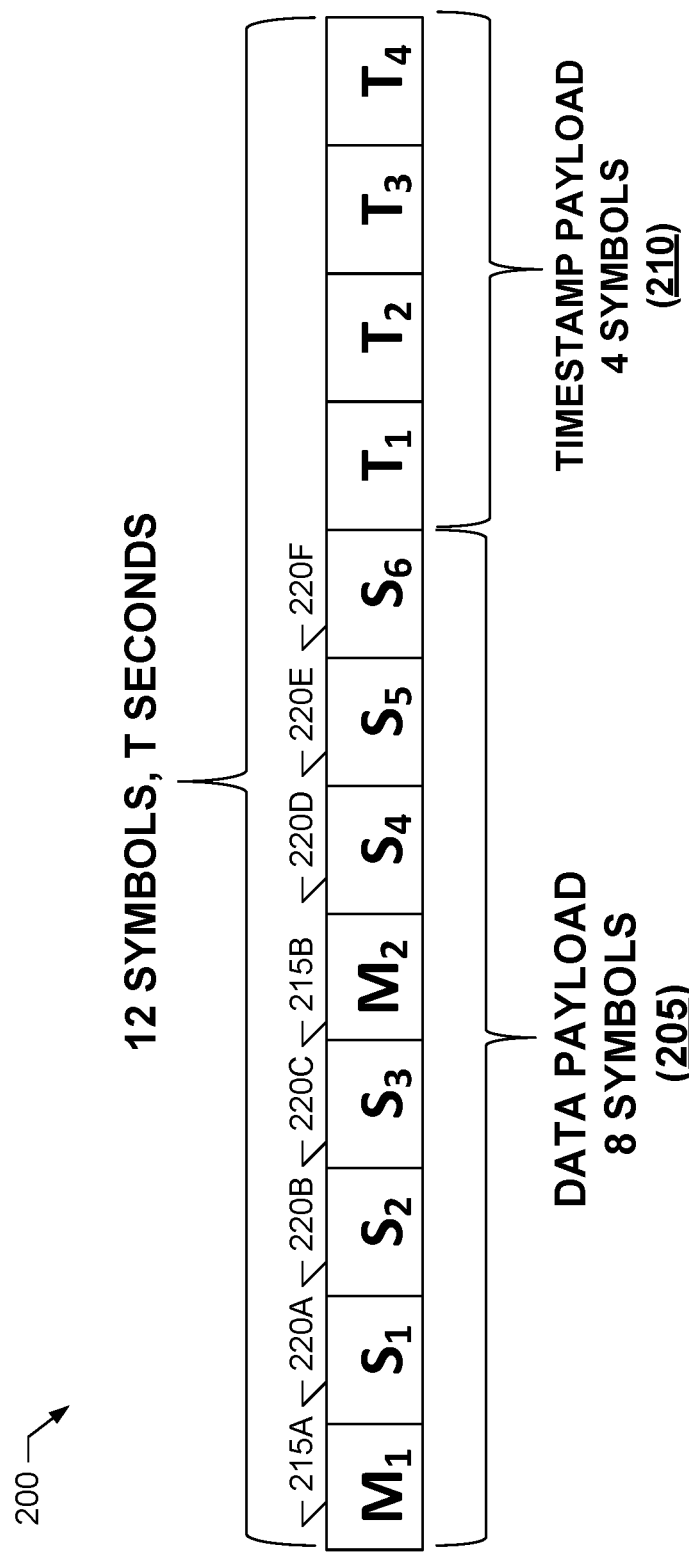
FIG. 2 is a block diagram of an example media watermark to be detected and processed by the example media monitoring system of FIG. 1.

FIG. 2 illustrates an example watermark 200 that the example meter 114 of FIG. 1 may be configured to detect. The watermark 200 of the illustrated example is embedded or otherwise included in media to be presented by media device(s), such as the example media device 110. For example, the watermark 200 may be embedded in an audio portion (e.g., an audio data portion, an audio signal portion, etc.) of the media, a video portion (e.g., a video data portion, a video signal portion, etc.) of the media, or a combination thereof. The example watermark 200 of FIG. 2 includes an example first group of symbols 205 and an example second group of symbols 210. In the illustrated example of FIG. 2, the first group of symbols 205 is repeated in successive watermarks 200 embedded/included in the media, whereas the second group of symbols 210 differs between successive watermarks 200 embedded/included in the media.

In the example watermark of FIG. 2, the first group of symbols 205 conveys media identification data (e.g., a media identifier) identifying the media watermarked by the watermark 200. For example, the media identification data conveyed by the first group of symbols 205 may include data identifying a broadcast station providing the media, a name (e.g., program name) of the media, a source (e.g., a website) of the media, etc. Thus, in the illustrated example of FIG. 2, the first group of symbols 205 is also referred to as a first group of media identification symbols 205 (or simply the media identification symbols 205 or media identification payload 205). In some examples, the first group of symbols 205 includes any type of data, which may or may not include media identification information. In such examples, the first group of symbols 205 may be referred to as the data symbols 205, or data payload 205, or data 205 of the watermark 200. In the illustrated example, the media identification data conveyed by the first group of symbols 205 (e.g., the media identification symbols 205) is repeated in successive watermarks 200 embedded/included in the media.

In some examples, the first group of symbols 205 of the watermark 200 includes example marker symbols 215A-B to assist the watermark decoder 145 in detecting the start of the watermark 200 in the watermarked media, and example data symbols 220A-F to convey the media identification data. Also, in some examples, corresponding symbols pairs in similar respective locations after the first marker symbol 215A and the second marker symbol 215B are related by an offset. For example, the value of data symbol 220D may correspond to the value of data symbol 220A incremented by an offset, the value of data symbol 220E may correspond to the value of data symbol 220B incremented by the same offset, and the value of data symbol 220F may correspond to the value of data symbol 220C incremented by the same offset, as well. In such examples, the symbols pairs 220A/D, 220B/E and 220C/F are referred to as symbol offset pairs, or offset pairs, and the offset used to generate the symbol offset pairs forms an additional data symbol that can be used to convey the media identification data.

For example, the watermark payload of example watermark 200 of FIG. 2 has the following structure:

[M1 S1 S2 S3 M2 S4 S5 S6 T1 T2 T3 T4]

where the symbols [S4 S5 S6] are related to the symbols [S1 S2 S3] according to the following first system of relationships:

$$S4=(S1+S0) \bmod 16$$

$$S5=(S2+S0) \bmod 16, \text{ and}$$

$$S6=(S3+S0) \bmod 16,$$

with "mod" representing the modulo operation. In this example, the symbol S0 is another symbol represented by the offset between symbols [S1 S2 S3] and symbols [S4 S5 S6]. In this example, the symbols [S0 S1 S2 S3] are data symbols representing a value of a media identifier, such as a source identifier (SID).

In the example watermark 200 of FIG. 2, the second group of symbols 210 conveys timestamp data (e.g., a timestamp) identifying, for example, a broadcast time of the watermarked media, an access time of the watermarked media, a creation time of the watermarked media, a particular elapsed time within the watermarked media, etc. Thus, in the illustrated example of FIG. 2, the second group of symbols 210 is also referred to as the second group of timestamp symbols 210 (or simply the timestamp symbols 210, or timestamp payload 210, or timestamp 210). Furthermore, the timestamp data conveyed by the second group of symbols 210 (e.g., the timestamp symbols 210) differs in successive watermarks 200 embedded/included in the media (e.g., as the elapsed time of the watermarked media increases with each successive watermark 200).

In the illustrated example of FIG. 2, the watermark 200 is embedded/included in media at a repetition interval of T seconds (or, in other words, at a repetition rate of 1/T seconds), with the first group of symbols 205 remaining the same in successive watermarks 200, and the second group of symbols 205 varying in successive watermarks 200. For example, the repetition interval T may correspond to T=4.8 seconds. As there are 12 symbols in the example watermark 200 (e.g., 8 symbols in the first group of symbols 205 and 4 symbols in the second group of symbols 210) each watermark symbol in the illustrated example has a duration of 4.8/12=0.4 seconds. However, other values for the repetition interval T may be used in other examples.

In some examples, a watermark symbol included in the watermark 200 is able to take on one of several possible symbol values. For example, if a symbol in the watermark 200 represents 4 bits of data, then the symbol is able to take on one of 16 different possible values. For example, each possible symbol value may correspond to a different signal amplitude, a different set of code frequencies, etc. In examples disclosed herein, each symbol of the timestamp is of base 28, and can take on one of 28 different possible values. Thus, in the illustrated example of FIG. 2, each individual symbol of the timestamp 210 is referred to as a symbol value (which can be represented as a digit, frequency, etc.). In some such examples, to detect a watermark symbol embedded/included in watermarked media, the example meter 114 processes monitored media data/signals output from the example media device 110 to determine measured values (e.g., signal-to-noise ratio (SNR) values) corresponding to each possible symbol value the symbol may have. The meter 114 then selects the symbol value corresponding to the best (e.g., strongest, largest, etc.) measured value (possibly after averaging across multiple samples of the media data/signal) as the detected symbol value for that particular watermark symbol.

In the illustrated example, the meter 114 further uses the relationships between the symbols [S1 S2 S3] and the symbols [S4 S5 S6] specified above to decode the other symbol S0 and further determine whether the decoded symbols correspond to a valid symbol sequence. For example, let [A1 A2 A3 A4 A5 A6] represent the respective values of the watermark symbols [S1 S2 S3 S4 S5 S6] detected by the meter 114. The detected watermark symbols [A1 A2 A3 A4 A5 A6] are related to the original watermark symbols [S1 S2 S3 S4 S5 S6] according to the following second system of relationships:

$A1=S1+\varepsilon 1$ $A2=S2+\varepsilon 2$ $A3=S3+\varepsilon 3$ $A4=S4+\varepsilon 4$ $A5=S5+\varepsilon 5$ $A6=S6+\varepsilon 6$ where [ε1 ε2 ε3 ε4 ε5 ε6] represent respective errors in the [A1 A2 A3 A4 A5 A6] relative to the original watermark symbols [S1 S2 S3 S4 S5 S6] (e.g., introduced by transmission errors, sensing errors, etc.) and the additions are modulo additions (e.g., modulo 16 additions in this example, but in other example, the modulo addition will be based on the number of different values each symbol can have, which corresponds to the number of bits represented by the symbol). To decode the symbol S0 and further validate the decoded symbols, the meter 114 attempts to find a single offset value that relates [A1 A2 A3] to [A4 A5 A6] by modulo addition according to the first system of relationships given above. To do this, the meter 114 assumes the values of the detected watermark symbols [A1 A2 A3] are correct and correspond to the original watermark symbols [S1 S2 S3]. The meter 114 then evaluates the first system of relationships above using different offset values to attempt to find one offset value that when added to each of [A1 A2 A3] by modulo addition results in [A4 A5 A6]. If the meter 114 is able to find one such offset value, that offset value is set to be the decoded value of S0, and the resulting sequence of decoded watermark data symbols [S0 S1 S2 S3] is considered valid. If the meter 114 is unable to find such a single offset value that relates each of [A1 A2 A3] to [A4 A5 A6] by modulo addition, the meter 114 determines the decoded watermark symbols are not valid. (In some examples, if two of the three decoded symbol pairs are related by the same offset, the resulting decoded symbols are not considered as invalid but are indicated as having a lower reliability score.)

Figure 3:
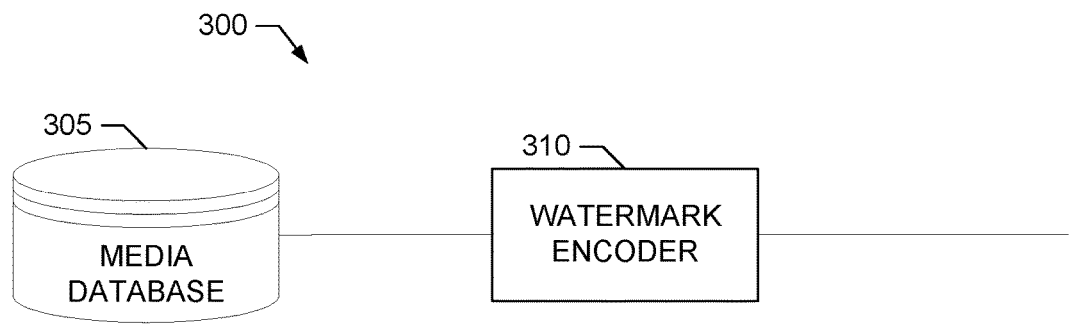
FIG. 3 is a block diagram of an example media provider including an example watermark encoder structured to extend a time range supported by a watermark in accordance with teachings of this disclosure.

A block diagram of an example media provider 300 capable of providing watermarked media in accordance with teachings of this disclosure is illustrated in FIG. 3. For example, the media provider 300 can correspond to any type of media provider, such as a television station, a cable network, a satellite network (e.g., television or radio), a radio station, a streaming media service (e.g., such as Hulu™, Netflix®, etc.), etc. As such, the media distributed by the media provider 200 can correspond to any type of media, such as television programming, radio programming, multimedia (e.g., audio and/or visual) content, etc. In the illustrated example, the media provider 300 can distribute a particular piece of media (e.g., such as a particular television program, a particular radio program, a particular movie, etc.) to recipients (e.g., television viewers, radio listeners, computer users, electronic device users, etc.) via one or more program broadcasts, distribution channels, etc. (e.g., such a one or more radio frequency, cable and/or satellite television and/or radio channels, one or more networks carrying one or more digital transport channels, etc.). The example media provider 300 can correspond to the media source 114 of FIG. 1.

In the illustrated example of FIG. 3, the media provider 300 includes an example media database 305 to store pieces of media (e.g., media content, media advertisements/commercials, etc.) to be distributed by the media provider 300. The media provider 300 can be implemented by any type or combination of one or more memories and/or storage devices. For example, the media provider 300 can be implemented by the mass storage device 1028 and/or the volatile memory 1014 in the example processing system 1000 of FIG. 10, which is described in further detail below.

The example media provider 300 of FIG. 3 also includes an example watermark encoder 310 to retrieve a piece of media stored in the media database 305 and encode (e.g., embed) a sequence of watermarks into the media. For example, the sequence of watermarks encoded by the watermark encoder 310 in the piece of media can be a sequence of audio watermarks, such as the watermark 200 of FIG. 2, encoded in audio portion(s) of the media at successive intervals of time (e.g., such as every 4.8 seconds or any other constant or changing interval of time) using any appropriate audio watermarking technique. Additionally or alternatively, the sequence of watermarks encoded in the piece of media by the watermark encoder 310 can be a sequence of video watermarks encoded in video portion(s) of the media content at successive intervals of time using any appropriate video watermarking technique. In some examples, the watermarks can include or otherwise convey media identifying payload data (e.g., the data payload 205) that identifies, for example, a source of the media content (e.g., such as the particular media provider 300) and/or the media itself (e.g., such as a title of the media content, an episode number, etc.). In some examples, the watermarks can include or otherwise convey timestamp payload data (e.g., the timestamp payload 210) representing a timestamp associated with the watermark. As disclosed in further detail below, the watermark encoder 310 is also structured to extend a timestamp range supported by the watermarks in accordance with teachings of this disclosure.

Figure 4:
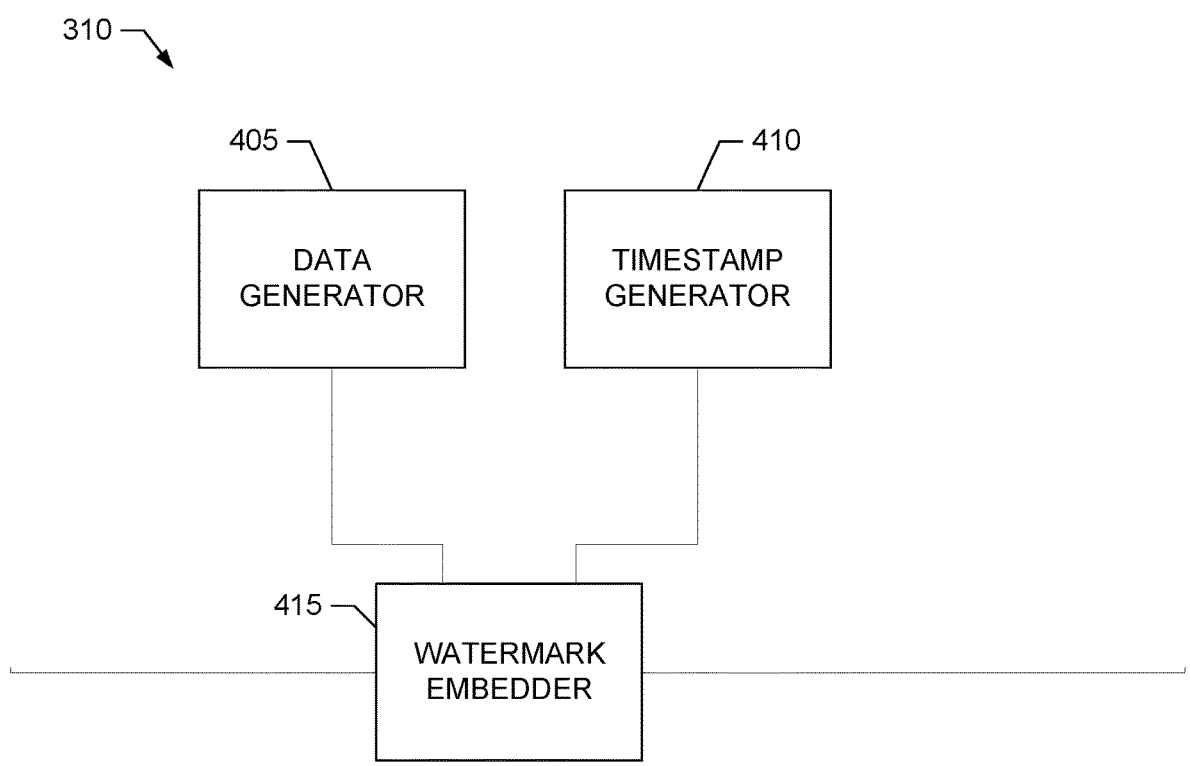
FIG. 4 is a block diagram of an example implementation of the watermark encoder of FIG. 3.

A block diagram of an example implementation of the watermark encoder 310 of FIG. 3 is illustrated in FIG. 4. The example watermark encoder 310 of FIG. 4 is structured to extend a range of a watermark timestamp, such as the timestamp 210, included in a watermark, such as the watermark 200, to be embedded in media. The example watermark encoder 310 of FIG. 4 includes an example data generator 405 to generate or otherwise obtain (e.g., download, retrieve from memory, etc.) the data symbols for the media identification payload 205 or data payload 205 of the watermark 200 described above. As such, the data generator 405 is an example of means for generating the media identification or data payload of a watermark to be embedded in media. The example watermark encoder 310 of FIG. 4 includes an example timestamp generator 410 to generate or otherwise obtain (e.g., from a clock, counter or other timing source) the timestamp symbols for the timestamp payload 210 of the watermark 200 described above. As such, the timestamp generator 410 is an example of means for generating the timestamp payload of a watermark to be embedded in media.

The example watermark encoder 310 of FIG. 4 further includes an example watermark embedder 415 to embed the watermark 200 in media (e.g., obtained from the media database 305). For example, the watermark embedder 415 may use any appropriate watermark embedding technique to embed the watermark 200 in an audio portion/signal and/or video portion/signal of the media. As such, the watermark embedder 415 is an example of means for embedding a watermark (e.g., after any symbol modification) in a first piece of media.

Figure 5:
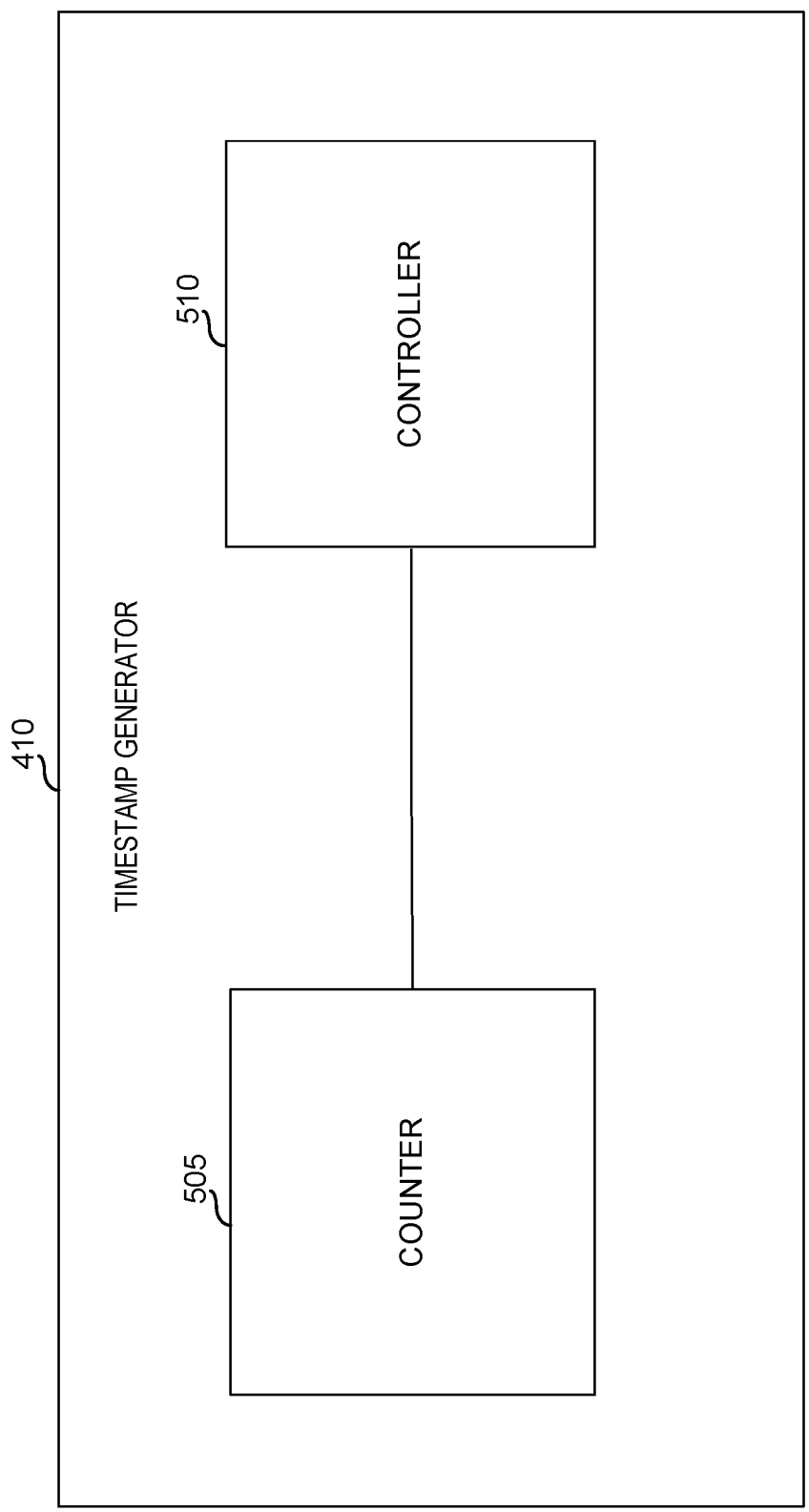
FIG. 5 is a block diagram of an example implementation of the timestamp generator of FIG. 4.

A block diagram of an example implementation of the timestamp generator 410 of FIG. 4 is illustrated in FIG. 5. The timestamp generator 410 includes an example counter 505 and example controller 510. The example counter 505 of the illustrated example of FIG. 5 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), Coarse Grained Reduced precision architecture (CGRA(s)), image signal processor(s) (ISP(s)), etc. In this example, the counter 505 is to count symbol positions of the example timestamp 210. However, the counter 505 may be additionally or alternatively used to count the data payload 205, or any other numeric system of interest. The counter 505 is incremented by the example controller 510, and the symbol values in the symbol positions of the counter 505 are used to generate the timestamp 210.

The timestamp generator 410 also includes example controller 510. The example controller 510 of the illustrated example of FIG. 5 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. the example controller 510 increments the counter 505 according to the counting scheme of FIG. 6.

FIG. 6 is a table that represents an example counting scheme to be implemented by the example encoder of FIGS. 3, 4 and/or 5 to encode watermark timestamps, and implemented by the example watermark decoder 145 of FIG. 7 to decode such encoded watermark timestamps. The table of the example counting scheme illustrated in FIG. 6 has six columns. In this example, the first column, labeled as "N", is a decimal equivalent of a 4-bit binary number. The "N" column represents an increment range or increment window where each timestamp symbol [T1 T2 T3 T4] can be represented by only the symbol values indicated by the logic 0's and 1's as described below and in accordance with the incrementing scheme disclosed herein.

In this example, the second column, labeled "binary", is a 4-bit binary representation of the permitted increment ranges of the respective timestamp symbols [T1 T2 T3 T4] of a timestamp, where T1 corresponds to the first timestamp symbol, T2 corresponds to the second timestamp symbol, etc. As such, the binary representation provided in the "binary" column is also referred to herein as a timestamp increment key, a timestamp increment map, a timestamp increment pattern, etc. In some examples, the "binary" column could be a binary representation of any number of bits corresponding to any number of timestamp symbols. In this example, the "binary" column uses 0's to represent timestamp symbols with increment ranges of 0-15 (corresponding to symbol values supported in a base-16 numeric representation), and 1's to represent timestamp symbols with increment ranges of 16-27 (corresponding to additional symbol values supported by a base-28 numeric representation). However, the 0's and 1's of the timestamp increment key included in the "binary" column could represent any alternative numbers, symbols, letters, etc., corresponding to any two different numeric bases).

In this example, the third column, labeled as "increments from 0 s", is a calculation of the number of increments (minutes) permitted by the symbols of the timestamp 210 corresponding to positions having a logic 0 in the timestamp increment key for that particular row of the table. As noted above, in the example of FIG. 6, a logic 0 in a given position of the timestamp increment key indicates that the timestamp symbol corresponding to that position is permitted to increment over a first range of 0-15 corresponding to a first numeric base of base-16. In the illustrated example, permitted symbol increments are further restricted such that two or more symbols of the timestamp 210 are not allowed to share the same value. (However, in some examples, such a restriction is not present and symbol values may repeat in the symbols of the timestamp 210.) For example, for the row corresponding to N=0, the number of increments able to be represented by the timestamp increment key "0000" is calculated by multiplying the ranges of symbol values able to be represented by timestamp symbols with a corresponding timestamp increment key values of 0 (which is a range of 16 symbol values in this example), but with the range decreasing by one for each additional logic 0 because the same symbol value is not allowed to repeat in multiple symbols of the timestamp 210. An example of such a restriction on repeated symbols values is provided in U.S. Pat. No. RE 42,627, which is hereby incorporated by reference in its entirety. As such, the number of increments from symbols with logic 0's in their respective positions of the timestamp increment key 0000 is 16×15×14×13, which corresponds to 43,680 minutes (assuming each increment corresponds to a minute). As such, in the illustrated example, N=0 represents a 28-day timestamp range, as the timestamp 210 uses symbol values from 0 to 15. In this example, each increment of the timestamp corresponds to one minute. However, in other examples, one increment of the timestamp 210 can correspond to any desired time interval, such a one or more seconds, one or more minutes, one or more hours, one or more days, etc.

In another example, for N=1, the number of increments from 0's in the binary timestamp 0001 is calculated by multiplying 16×15×14 (three 0's and one 1) which corresponds to 3360 increments. When the binary representation of the timestamp increment key does not include any 0's (i.e., N=15), the increments from 0's is set equal to 1 as to not lose the increments from 1's as shown in the fourth column. The number of increments permitted by the symbol having a logic 1 in the corresponding position of the timestamp increment key is discussed below.

Like the calculations of column three, the fourth column, labeled as "increments from 1 s", is a calculation of the number of increments (minutes) permitted by the symbols of the timestamp 210 corresponding to positions having a logic 1 in the timestamp increment key for that particular row of the table. As noted above, a logic 1 in a given position of the timestamp increment key indicates that the timestamp symbol corresponding to that position is permitted to increment over a second range of 16-27 corresponding to a second numeric base of base-28. In the illustrated example, permitted symbol increments are further restricted such that two or more symbols of the timestamp 210 are not allowed to share the same value. (However, in some examples, such a restriction is not present and symbol values may repeat in the symbols of the timestamp 210.) For example, for the row corresponding to N=15, the number of increments able to be represented by the timestamp increment key "1111" is calculated by multiplying the ranges of symbol values able to be represented by timestamp symbols with a corresponding timestamp increment key values of 1 (which represent symbol values from 16-27, which is a range of 12 symbol values in this example), but with the range decreasing by one for each additional logic 1 because the same symbol value is not allowed to repeat in multiple symbols of the timestamp 210. As such, the number of increments from symbols with logic 1's in their respective positions of the timestamp increment key 1111 is 12×11×10×9, which corresponds to 11,880 minutes (assuming each increment corresponds to a minute). When the binary representation of the timestamp does not include any 1's (i.e. N=0), the increments from 1's is set equal to 1 as to not lose the increments from 0's as shown in the fourth column.

The fifth column of FIG. 6 is a calculation of the overall increment range/window permitted by the symbols of the timestamp 210 for the timestamp increment key for that particular row of the table. The overall number of increments for each timestamp increment key is calculated by multiplying the number of increments permitted by timestamp symbols having 0's in the corresponding positions of that timestamp increment key by the number of increments permitted by timestamp symbols having 1's in the corresponding positions of that timestamp increment key. In this example, one increment is equal to one minute. As such, the total number of increments permitted by the symbols of the timestamp 210 for a given timestamp increment key is equivalent to the number of minutes able to be represented by that timestamp increment key using this incrementing scheme. However, in other examples, one increment of the timestamp 210 can correspond to any desired time interval, such a one or more seconds, one or more minutes, one or more hours, one or more days, etc. The total number of increments permitted by this incrementing scheme (or the total range of the timestamp) is equal to the sum of the increments for each timestamp increment key. In this example, the sum of the increments for each timestamp increment key is 491,400 increments. As such, the total range of the timestamp in this example is 491,400 minutes.

The sixth column of FIG. 6 indicates the backwards compatibility of the range of timestamp values of the timestamp 210 for a given timestamp increment key. A timestamp increment key is considered to be backwards compatible or, using the terminology of the sixth column of the table, an "old" system, when the timestamp increment key permits symbol values from only a first range (e.g., from 0-15) corresponding to a prior watermarking system. For example, for the row corresponding to N=0 with the timestamp increment key of "0000", the timestamp is considered to be of the "old" system because the timestamp increment key can only permits the timestamp to use symbols from the first range. However, for example, for the row corresponding to N=1 with the timestamp increment key of "0001", the timestamp is considered to be of the "new" system because at least one symbol position of the timestamp (i.e., T4) is restricted to symbol values from the second range (e.g., from 16-27). As another example, for the row corresponding to N=10 with the timestamp increment key of "1010", timestamp symbols T1 and T3 are restricted to timestamp symbol values from the second range. Thus, the timestamps generated in accordance with this timestamp increment key are considered to be of the "new" system. As such, the rows of FIG. 6 that are considered to be of the "new" system correspond to the additional range of the timestamp due to the introduction of the second range of symbol values according to this incrementing scheme.

In the illustrated example implementation, the timestamp 210 is incremented every minute using the scheme of FIG. 6, enabling the range of the timestamp 210 to increase while maintaining the existing incrementing scheme for the initial 28-day period supported by the timestamp 210. In order to accurately portray the introduction of the second range of symbol values to extend the range of the timestamp, the timestamp incrementing key is shown in the "binary" column of FIG. 6. In this example, with each timestamp increment key, symbols represented as 0's are restricted to have symbol values from 0-15 and symbols represented as 1's are restricted to have symbol values from 16-27. In some examples, symbols of the timestamp are referred to as being of a certain set (e.g., a first set, a second set, a third set, etc.) according to their restricted symbol value range dictated by the timestamp incrementing key. In the illustrated example of FIG. 5, the counter 505 is used to represent the timestamp symbols [T1 T2 T3 T4]. As such, the controller 510 initially increments the counter 505 through all symbol values in the positions of logic 0's of the timestamp increment key, and then increments a symbol value in the position of a logic 1 of the timestamp increment key and returns to incrementing through symbol values in positions of logic 0's of the timestamp increment key again, and the process repeats.

For example, for the row corresponding to N=0 with the timestamp increment key of "0000", each of the symbols T1, T2, T3, and T4 is permitted to increment over symbol values from the first range (0-15). The controller 510 increments the counter 505 through all symbol positions corresponding to logic 0's of the timestamp increment key, which in this example corresponds to all of symbols of the timestamp. For example, the counter 505 may begin at [0, 1, 2, 3] (as that is the lowest timestamp value in which no symbol values repeat) and be incremented to [0, 1, 2, 4] and so on. Upon reaching [0, 1, 2, 15], the counter 505 is incremented to [0, 1, 3, 2] such that no symbol value goes above 15 (in order to follow the permitted symbol values indicated by the timestamp increment key) and no symbols are repeated within the same timestamp.

When the counter 505 has been incremented through all possible combinations within the timestamp increment key "0000", the counter 505 is incremented according to the next timestamp increment key "0001" as illustrated in FIG. 6. The controller 510 increments the symbol of the counter 505 corresponding to the logic-1 position of the timestamp increment key "0001" such that it has a value of 16. The controller 510 then increments the symbols of the counter 505 corresponding to the logic-0 positions of the timestamp increment key "0001" through the permitted values of 0-15, then increments the symbol of the counter 505 corresponding to the logic 1 position of the timestamp increment key "0001", and then increments the symbols of the counter 505 corresponding to of logic 0's of the timestamp increment key "0001" again, and so on. For example, for the row corresponding to N=1 with a timestamp increment key of "0001", the counter 505 may be incremented to have symbol values of [0, 1, 2, 16]. The controller 510 would increment the counter 505 to [0, 1, 3, 16] and so on. Upon reaching [13, 14, 15, 16], the counter 505 would be incremented to [0, 1, 2, 17] and the counter would increment through the symbol values corresponding to logic 0 positions of the timestamp increment key "0001" again. This process would repeat until all possible combinations of the symbol values permitted by the timestamp increment key have been represented without repeating symbol values within the same timestamp. Upon incrementing through all possible combinations within the timestamp incrementing key of "0001", the same process is repeated for the timestamp increment key of "0010", then "0011", and so on.

The controller 510 begins incrementing over the range specified by the timestamp increment key for the N=0 row and continues down each row of FIG. 6 until it reaches N=15, incrementing over the range specified by the timestamp increment key for each corresponding row (where logic 0's represent those timestamp symbol(s) restricted to values from a first range and logic 1's represent those timestamp symbol(s) restricted to values from a second range). Upon completing all increments specified by the timestamp increment key for the N=15 row, the controller 510 returns to the N=0 row and begins to increment the counter 505 over the range specified by the timestamp increment key for the N=0 row. The controller 510 does not increment the counter 505 according to conventional numeric base incrementing, but rather increments symbols out of order according to the specified timestamp increment key and the rules associated with each timestamp increment key as mentioned above. As such, the symbol values of the counter 505 are incremented so that every increment of the counter 505 according to the timestamp increment key maps sequentially to time. This enables each increment within each timestamp increment key to be sequentially mapped to a particular time, and allows for a continuous flow of increments to be mapped sequentially to time for rows N=0 thought N=15. In other words, despite following a timestamp increment key for N=0 through N=15, the counter 505 maintains a continuous mapping to time.

The illustrated example of FIG. 6 is to be implemented by the example watermark encoder 310. In this example, the timestamp generator 410 outputs the timestamp 210 at each increment in accordance with the discussion of FIG. 6. above. The watermark embedder 415 then embeds the watermark 200 including the timestamp 210 into media. The watermark embedder 415 may embed the watermark through amplitude modulation, frequency modulation, frequency code, etc. As such, the watermark embedder 415 embeds the symbol values from the first range (or "old" system symbol values) using the existing frequencies, amplitudes, etc., and/or any combinations thereof already in place for those symbol values and embeds symbol values from the second range (or "new" system symbol values) using new frequencies, amplitudes, etc., and/or any combinations thereof. As such, the watermark embedder 415 maintains backwards compatibility with the existing watermarking schemes while implementing the extended range of the timestamp 210.

It is noted that the illustrated example of FIG. 6 is for a particular case where each increment corresponds to 1 minute. However, each increment may additionally or alternatively map to any amount of time. In this example, logic 0's of the timestamp increment key represent a first permitted symbol range the corresponds to base 16 (i.e., values from 0-15). Similarly, logic 1's of the timestamp increment key represent a second permitted symbol range of base 28 (i.e., values from 16-27). However, any other range of values could be represented by the logic 0's and/or the logic 1's of the timestamp increment key. In some examples, the range of values represented by logic 0's and logic 1's may contain some or all of the same values.

An example watermark decoder 145 that may be included in the example meter 114 of FIG. 1 to decode watermarks embedded in media is illustrated in FIG. 7. The watermark decoder 145 of the illustrated example is structured to extend a range of a watermark timestamp, such as the timestamp 210, included in a watermark, such as the watermark 200, embedded in monitored media. The example watermark decoder 145 includes an example symbol decoder 705 to decode symbols of a watermark detected in monitored media. For example, the symbol decoder 705 may use any appropriate watermarking detection technique to decode symbols of the watermark 200 detected as embedded in an audio portion/signal and/or video portion/signal of the media. The symbols detected by the symbol decoder 705 of the illustrated example include the detected symbols [A1 A2 A3 A4 A5 A6] of the data payload 205 described above, as well as detected versions of the symbols [T1 T2 T3 T4] of the timestamp payload 210 of the watermark 200. The symbol decoder 705 is able to detect symbols of the timestamp payload 210 from both the existing (or "old") system, as well as the new system as discussed in connection with FIG. 6. As such, the watermark decoder 145 is an example of means for decoding symbols of a watermark embedded in monitored media.

The symbol interpreter 710 of the illustrated example is included in the watermark decoder 145 to interpret the data symbols of the data payload 205 and the timestamp symbols of the timestamp 210 for a detected watermark 200. In the illustrated example, the symbol interpreter 710 determines a time associated with a timestamp 210. The time associated with the timestamp 210 is determined by comparing the decoded timestamp with the timestamp increment keys of FIG. 6 and associating a time with the timestamp 210 based on the symbol values and the timestamp increment key of the timestamp. For example, the symbol interpreter 710 can determine the timestamp increment key for a given timestamp value by determining that timestamp symbols having values in the first range map to logic-0 positions of the timestamp increment key, and timestamp symbols having values in the second range map to logic-1 positions of the timestamp increment key. The resulting logic-0 and logic-1 positions map to a particular timestamp increment key, which then maps to a particular timestamp increment range. The value of the timestamp can then be mapped to a particular increment in that increment range, which maps to a time based on the time interval associated with each increment. As such, the symbol interpreter 710 is an example of means for interpreting a detected watermark, and to map that watermark to its corresponding time value, no matter if the timestamp 210 is from the existing system or the new system.

The watermark reporter 715 of the illustrated example is included in the watermark decoder 145 to report the final version of the watermark 200 decoded from the monitored media. For example, the watermark reporter 715 reports the data payload 205 of the decoded watermark 200 to be the set of decoded data symbols. The watermark reporter 715 of the illustrated example reports the timestamp payload 210 of the watermark 200 as the time value represented by the decoded symbols of the timestamp 210, as described above. For example, watermark reporter 715 may report the time represented by the decoded timestamp 210 to be the value of the timestamp 210 as understood by the symbol interpreter 710. In the illustrated example of FIG. 6, each timestamp is mapped to time value based on the symbol values contained within the timestamp. As such, each timestamp increment key uses specific timestamp symbol value ranges for each symbol within the timestamp to accurately map the timestamp to the appropriate time value associated with the timestamp. As such, watermark reporter 715 is an example of means for constructing final watermark data from watermark symbols decoded from a detected watermark and understood through the interpretation of timestamp symbols which map the timestamp of the watermark to a time within a system. The watermark reporter 715 then reports the decoded watermark 200 to the central facility 190, as described above. While example manners of implementing the watermark encoder 310 and the watermark decoder 145 are illustrated in FIGS. 3, 4, 5, and 7, one or more of the elements, processes and/or devices illustrated in FIGS. 3, 4, 5, and 7 may be combined, divided, re-arranged, omitted, eliminated and/or implemented in any other way. Further, the example data generator 405, the example timestamp generator 410, the example watermark embedder 415, the example counter 505, the example controller 510, the example symbol decoder 705, the example symbol interpreter 710, the example watermark reporter 715 and/or, more generally, the example watermark encoder 310 and the example watermark decoder 145 of FIGS. 3, 4, 5, and 7 may be implemented by hardware, software, firmware and/or any combination of hardware, software and/or firmware. Thus, for example, any of the example data generator 405, the example timestamp generator 410, the example watermark embedder 415, the example counter 505, the example controller 510, the example symbol decoder 705, the example symbol interpreter 710, the example watermark reporter 715 and/or, more generally, the example watermark encoder 310 and the example watermark decoder 500 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example watermark encoder 310, the example watermark decoder 145, the example data generator 405, the example timestamp generator 410, the example watermark embedder 415, the example counter 505, the example controller 510, the example symbol decoder 705, the example symbol interpreter 710, the example watermark reporter 715 is/are hereby expressly defined to include a non-transitory computer readable storage device or storage disk such as a memory, a digital versatile disk (DVD), a compact disk (CD), a Blu-ray disk, etc. including the software and/or firmware. Further still, the example watermark encoder 310 and/or the example watermark decoder 145 may include one or more elements, processes and/or devices in addition to, or instead of, those illustrated in FIGS. 3, 4, 5, and 7, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
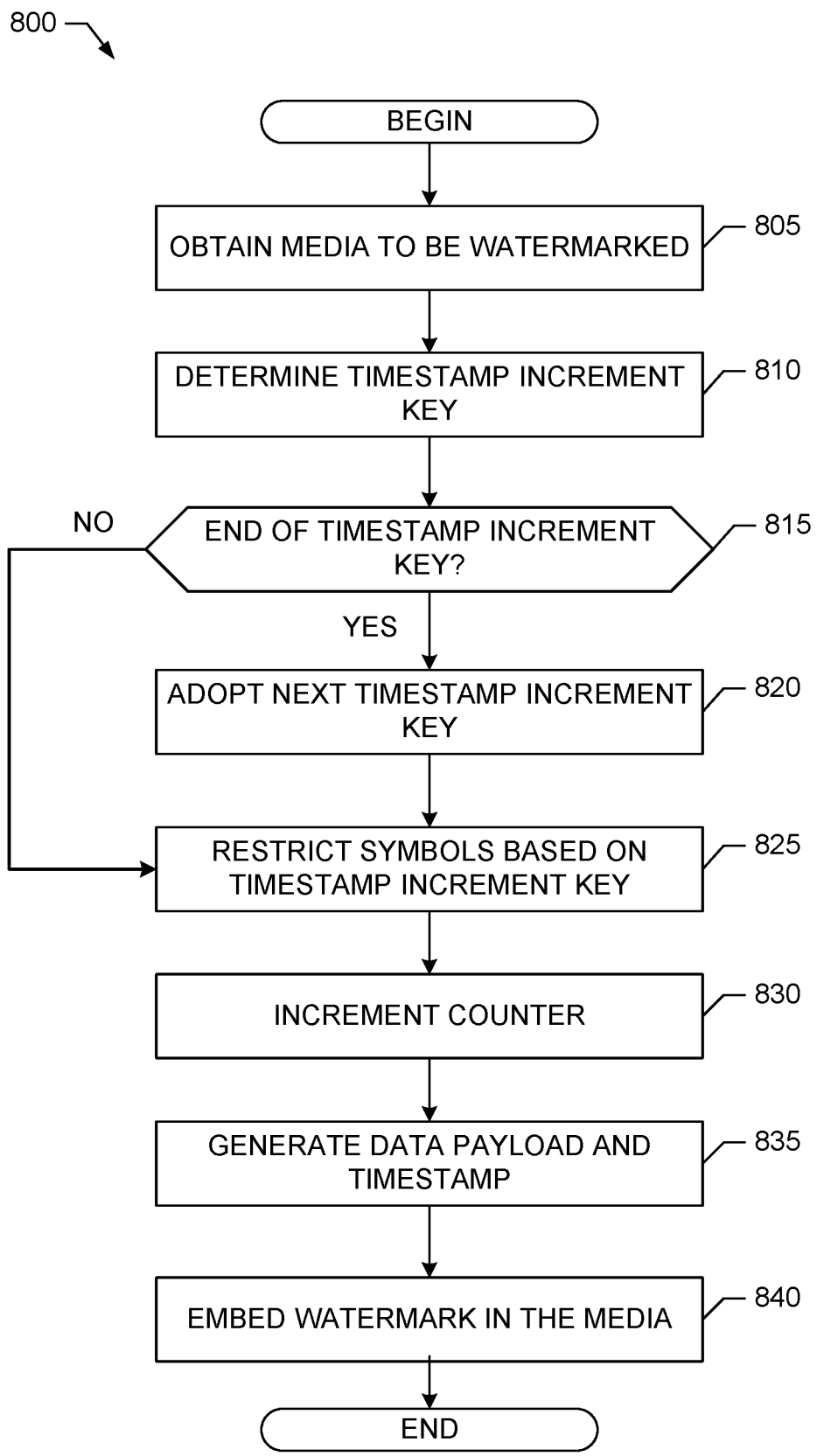
FIG. 8 is a flowchart representative of example computer readable instructions that may be executed to implement the example watermark encoder of FIGS. 3 and/or 4.
Figure 9:
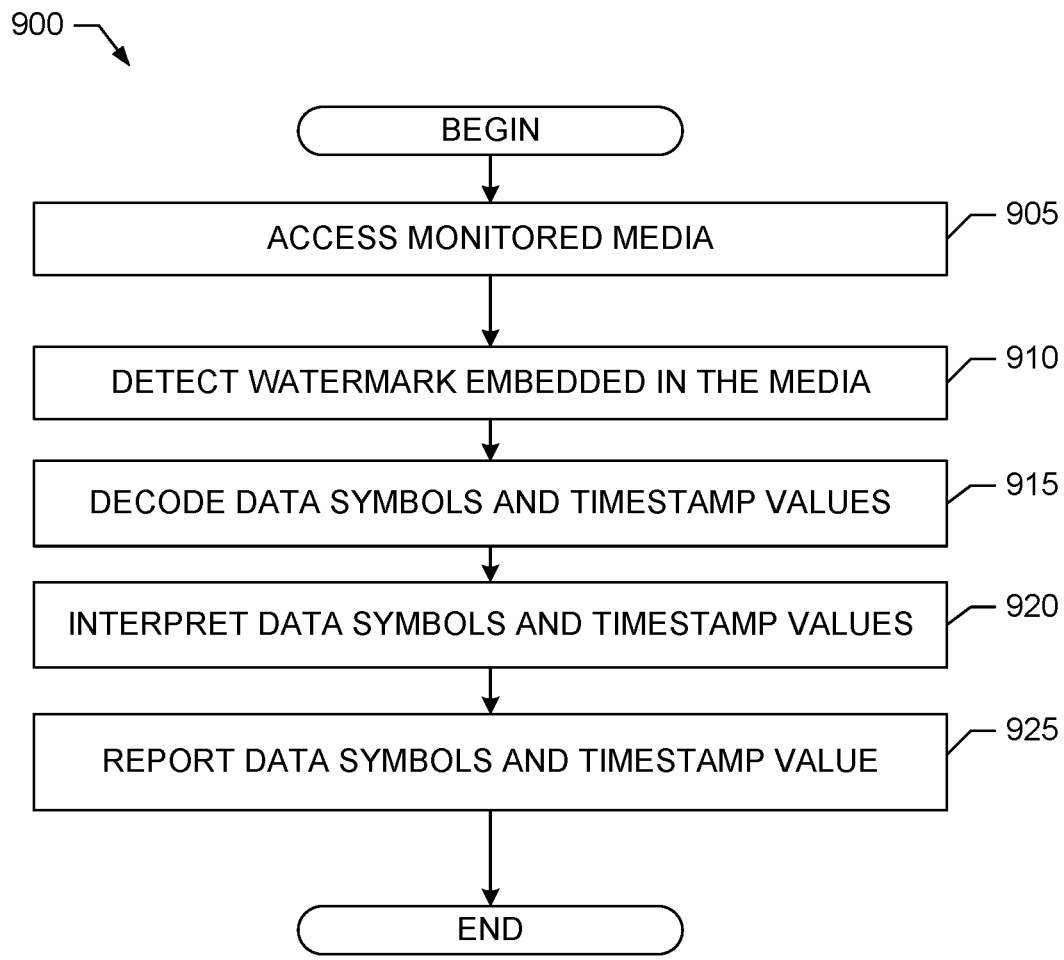
FIG. 9 is a flowchart representative of example computer readable instructions that may be executed to implement the example watermark decoder of FIG. 7.

Flowcharts representative of example hardware logic, machine readable instructions, hardware implemented state machines, and/or any combination thereof for implementing the example watermark encoder 310 and the example watermark decoder 145 are shown in FIGS. 8-9. In these examples, the machine readable instructions may be one or more executable programs or portion(s) thereof for execution by a computer processor and/or processor circuitry, such as the processor 1012 and/or the processor 1112 shown in the example processor platform 1000 and/or the example processor platform 1110 discussed below in connection with FIGS. 10-11. The program may be embodied in software stored on a non-transitory computer readable storage medium such as a CD-ROM, a floppy disk, a hard drive, a DVD, a Blu-ray disk, or a memory associated with the processor 1012 and/or the processor 1112, but the entire program and/or parts thereof could alternatively be executed by a device other than the processor 1012 and/or the processor 1112 and/or embodied in firmware or dedicated hardware. Further, although the example program(s) is(are) described with reference to the flowcharts illustrated in FIGS. 8-9, many other methods of implementing the example watermark encoder 310 and the example watermark decoder 145 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 8-9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 8 is a flowchart representative of example computer readable instructions that may be executed to implement the example watermark encoder of FIGS. 3 and/or 4. With reference to the preceding figures and associated written descriptions, the example instructions 800 of FIG. 8 begins execution at block 805 at which the example watermark embedder 415 of the watermark encoder 310 obtains a piece of media be watermarked, such as from the example media database 305, as described above.

At block 810, the example controller 510 then determines the timestamp increment key of the counter 505. At block 815, the controller 510 determines whether the counter 505 is at the end of the determined timestamp increment key (e.g., the counter 505 has incremented through all possible increments within the current timestamp increment key). If the controller 510 determines that the counter 505 is at the end of the timestamp increment key (e.g., block 815 returns a result of YES) the controller 510 proceeds to block 820 where the controller adopts the next timestamp increment key as discussed in connection with FIG. 6 above. At block 825, the controller restricts the symbol values of the symbols of the counter to the range indicated by the adopted timestamp increment key. If the controller 510 determines that the counter 505 is not at the end of the timestamp increment key (e.g., block 815 returns a result of NO) the controller 510 proceeds to block 825 where the controller restricts the symbol values of the symbols of the counter to the range indicated by the timestamp increment key.

At block 830, the controller 510 then increments the counter 505 based on the timestamp increment key. In this example, the controller uses the timestamp increment key until it is determined that the counter has incremented through the entire range of the increment key, then uses the adopted (or next) timestamp increment key until it is determined that the counter has incremented through the entire range of the adopted increment key, and so on. For example, the controller 510 will increment the counter 505 based on the timestamp increment key of "0000" until it is determined that the counter has incremented through the entire range of the "0000" timestamp increment key. Upon that determination, the controller will adopt the next timestamp increment key of "0001" and increment through the entire range of that timestamp increment key. Upon the determination that the counter 505 has incremented through the entire range of the "0001" timestamp increment key, the controller will adopt the "0010" timestamp increment key and will continue to adopt the next timestamp increment key. In some examples and as discussed above, incrementing the counter 505 can cause multiple symbol values at multiple symbol positions to change (e.g., a counter whose symbol values are [12 13 14 15] may increment to [0 1 2 16]).

At block 835, the example data generator 405 generates the data payload 205 and the controller 510 of the timestamp generator 410 generates the timestamp 210 for the watermark 200. In this example, the controller 510 uses the symbol values at each symbol position of the counter 505 to generate the timestamp 210. At block 840, the example watermark embedder 415 embeds the watermark 200 in the media, as described above.

FIG. 9 is a flowchart representative of example computer readable instructions that may be executed to implement the example watermark decoder of FIG. 7. With reference to the preceding figures and associated written descriptions, the example instructions 900 of FIG. 9 begins execution at block 905 at which the example symbol decoder 705 of the watermark decoder 145 accesses monitored media. At block 910, the symbol decoder 705 detects a watermark 200 embedded in the monitored media.

At block 915, the symbol decoder 705 decodes the symbols of the detected watermark 200, including the decoded data symbols for the data payload 205 of the watermark 200 and the decoded timestamp symbols for the timestamp payload 210 of the watermark 200. The example symbol decoder 705 may also determine the timestamp increment key of the timestamp 210 based on the decoded timestamp symbols. At block 920, the example symbol interpreter 710 interprets the detected watermark 200 in order to associate the decoded timestamp symbols 210 of the watermark 200 with a time. In this example, the symbol interpreter 710 is able to associate the decoded timestamp symbols 210 with a time based on the timestamp increment key. As such, the symbol interpreter 710 is able to associate a time with timestamps from both the "old" and "new" systems as discussed in connection with FIG. 6. At block 925, the example watermark reporter 715 of the watermark decoder 145 reports, as described above, the detected watermark 200, which includes the decoded data symbols for the data payload 205 and the timestamp payload 210, and a time associated with the timestamp 210. In some examples, the watermark reporter 715 may also report the timestamp increment key of the timestamp 210.

Figure 10:
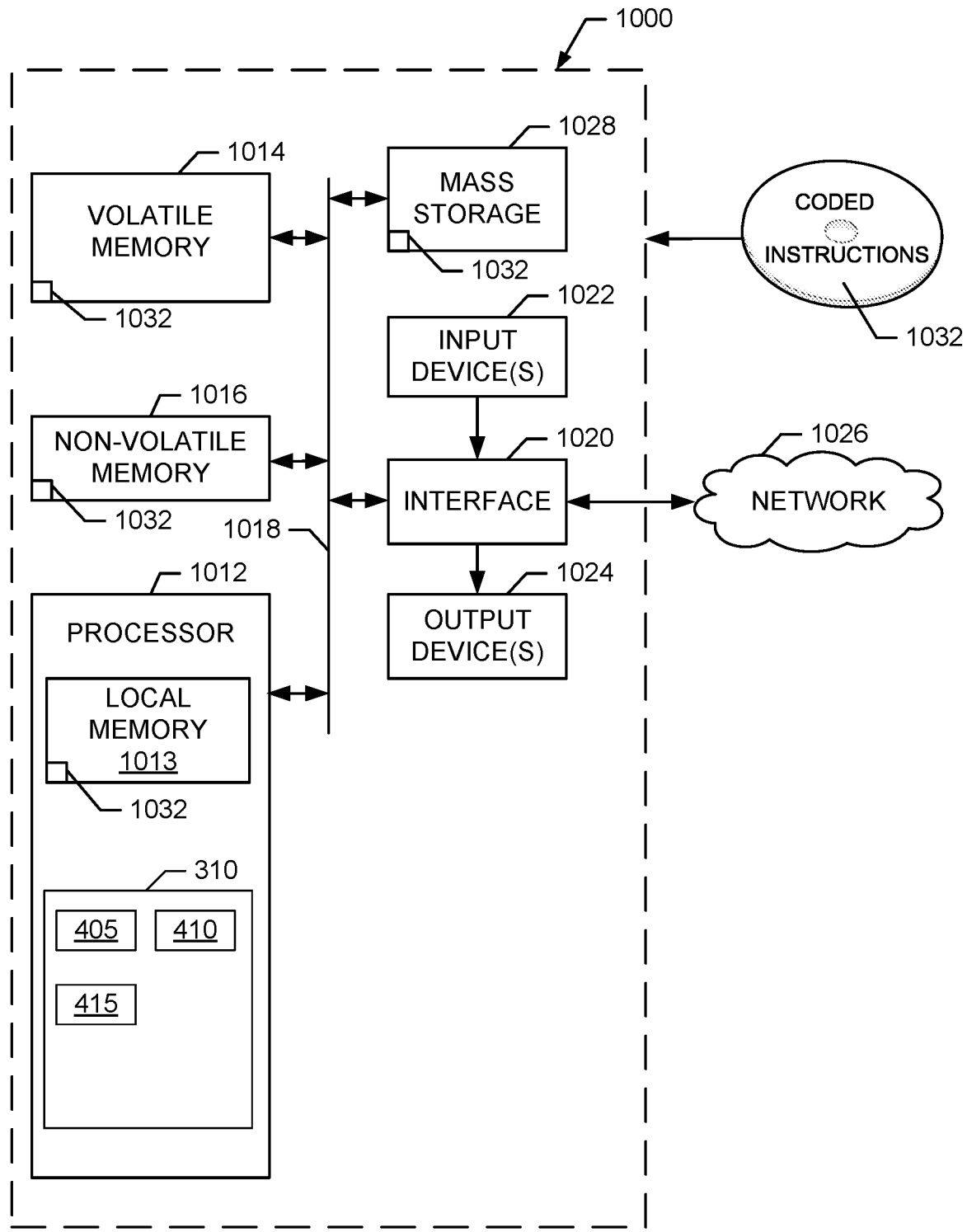
FIG. 10 is a block diagram of an example processor platform structured to execute the example computer readable instructions of FIG. 8 to implement the example watermark encoder of FIGS. 3 and/or 4.

FIG. 10 is a block diagram of an example processor platform 1000 structured to execute the instructions of FIG. 8 to implement the example watermark encoder 310 of FIGS. 3, 4, and/or 5. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a digital camera, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. The hardware processor 1012 may be a semiconductor based (e.g., silicon based) device. In this example, the processor 1012 implements the example data generator 405, the example timestamp generator 410, and/or the example watermark embedder 415.

The processor 1012 of the illustrated example includes a local memory 1013 (e.g., a cache). The processor 1012 of the illustrated example is in communication with a main memory including a volatile memory 1014 and a non-volatile memory 1016 via a link 1018. The link 1018 may be implemented by a bus, one or more point-to-point connections, etc., or a combination thereof. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1000, can allow the user to control the computer system and provide data to the computer using physical gestures, such as, but not limited to, hand or body movements, facial expressions, and face recognition.

One or more output devices 1024 are also connected to the interface circuit 1020 of the illustrated example. The output devices 1024 can be implemented, for example, by display devices (e.g., a light emitting diode (LED) display, an organic light emitting diode (OLED) display, a liquid crystal display (LCD), a cathode ray tube (CRT) display, an in-place switching (IPS) display, a touchscreen, etc.), a tactile output device, a printer and/or speakers(s). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL), connection, a telephone line connection, coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 corresponding to the instructions of FIG. 8 may be stored in the mass storage device 1028, in the volatile memory 1014, in the non-volatile memory 1016, in the local memory 1013 and/or on a removable non-transitory computer readable storage medium, such as a CD or DVD 1036.

Figure 11:
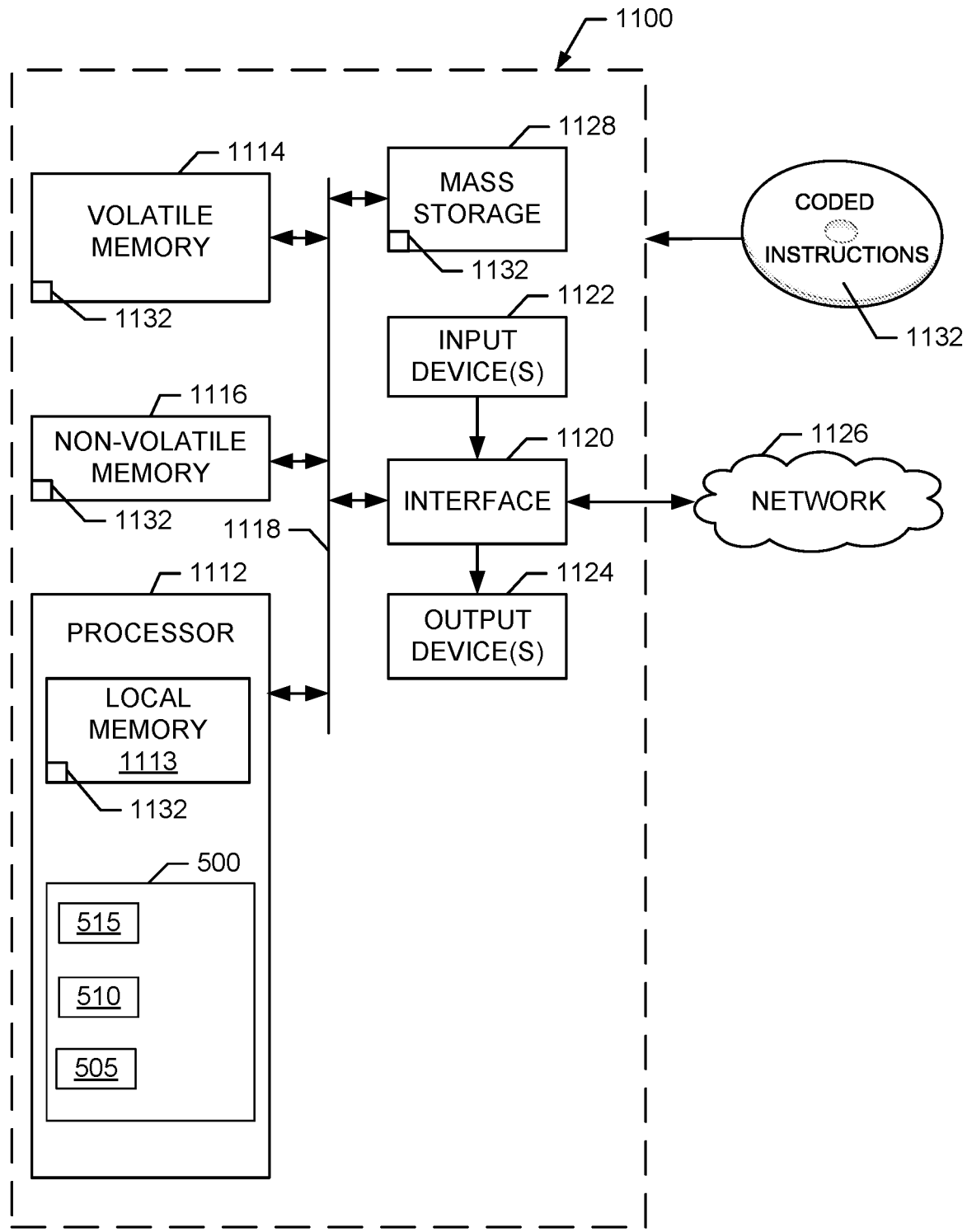
FIG. 11 is a block diagram of an example processor platform structured to execute the example computer readable instructions of FIG. 9 to implement the example watermark decoder of FIG. 7.

FIG. 11 is a block diagram of an example processor platform 1100 structured to execute the instructions of FIG. 9 to implement the example watermark decoder 145 of FIG. 7. The processor platform 1100 can be, for example, a server, a personal computer, a workstation, a self-learning machine (e.g., a neural network), a mobile device (e.g., a cell phone, a smart phone, a tablet such as an iPad™), a PDA, an Internet appliance, a DVD player, a CD player, a digital video recorder, a Blu-ray player, a gaming console, a personal video recorder, a set top box, a digital camera, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. The hardware processor 1112 may be a semiconductor based (e.g., silicon based) device. In this example, the processor 1112 implements the example symbol decoder 705, the example symbol interpreter 710, and/or the example watermark reported 715.

The processor 1112 of the illustrated example includes a local memory 1113 (e.g., a cache). The processor 1112 of the illustrated example is in communication with a main memory including a volatile memory 1114 and a non-volatile memory 1116 via a link 1118. The link 1118 may be implemented by a bus, one or more point-to-point connections, etc., or a combination thereof. The volatile memory 1114 may be implemented by SDRAM, DRAM, RDRAM® and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a USB interface, a Bluetooth® interface, an NFC interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1100, can allow the user to control the computer system and provide data to the computer using physical gestures, such as, but not limited to, hand or body movements, facial expressions, and face recognition.

One or more output devices 1124 are also connected to the interface circuit 1120 of the illustrated example. The output devices 1124 can be implemented, for example, by display devices (e.g., an LED display, an OLED display, an LCD display, a CRT display, an IPS display, a touchscreen, etc.), a tactile output device, a printer and/or speakers(s). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a DSL, connection, a telephone line connection, coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and DVD drives.

The machine executable instructions 1132 corresponding to the instructions of FIG. 9 may be stored in the mass storage device 1128, in the volatile memory 1114, in the non-volatile memory 1116, in the local memory 1113 and/or on a removable non-transitory computer readable storage medium, such as a CD or DVD 1136.

From the foregoing, it will be appreciated that example methods, apparatus and articles of manufacture have been disclosed that extend the range of a timestamp included in a watermark. The disclosed methods, apparatus and articles of manufacture improve the efficiency of using a computing device by extending a range of a timestamp such that that encoded watermarks can represent longer durations of watermarked media and/or finer granularities of watermarked media. In addition, the timestamp range is extended while maintaining backwards compatibility, enabling correct decoding of legacy watermarked media. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A watermark encoder comprising:
counter circuitry to increment symbols of a watermark timestamp; and
controller circuitry to:
control the counter circuitry to increment the symbols of the watermark timestamp based on a first value of a key, the controller circuitry to cause the counter circuitry to restrict ones of the symbols to increment over one of a first range of symbol values or a second range of symbol values based on the first value of the key, the second range of symbol values different from the first range of symbol values;
determine whether the counter circuitry has completed incrementing the symbols of the watermark timestamp based on the first value of the key;
in response to a determination that the counter circuitry has completed incrementing the symbols of the watermark timestamp based on the first value of the key, select a second value of the key; and
control the counter circuitry to increment the symbols of the watermark timestamp based on the second value of the key, the controller circuitry to cause the counter circuitry to restrict ones of the symbols to increment over one of the first range of symbol values or the second range of symbol values based on the second value of the key.

2. The watermark encoder of claim 1, wherein the controller circuitry is to:
cause the counter circuitry to increment first ones of the symbols restricted to the first range of symbol values based on the first value of the key;
after the first ones of symbols have been incremented over the first range of symbol values, increment a second one of the symbols restricted to the second range of symbol values based on the first value of the key; and
after the second one of the symbols has been incremented, increment the first ones of the symbols over the first range of symbol values.

3. The watermark encoder of claim 1, wherein the controller circuitry is to:
cause the counter circuitry to restrict, based on the first value of the key, a first set of the symbols of the watermark timestamp to increment over the first range of symbol values and a second set of the symbols to increment over the second range of symbol values; and
cause the counter circuitry to restrict, based on the second value of the key, a third set of the symbols to increment over the first range of symbol values and a fourth set of the symbols to increment over the second range of symbol values, the third set different from the first set and the fourth set different from the second set.

4. The watermark encoder of claim 1, wherein the controller circuitry is to:
generate the watermark timestamp based on the symbol values of the counter circuitry; and
output the watermark timestamp to a watermark embedder.

5. The watermark encoder of claim 1, further including watermark embedder circuitry to embed the watermark timestamp into media.

6. An apparatus comprising:
counter circuitry to increment symbols of a watermark timestamp; and
controller circuitry to control the counter circuitry to increment the symbols of the watermark timestamp based on a key, the controller circuitry to cause the counter circuitry to restrict ones of the symbols to increment over one of a first range of symbol values or a second range of symbol values based on a value of the key, the second range of symbol values different from the first range of symbol value, wherein the first range of symbol values corresponds to symbol values of base 16 from 0 to 15, and the second range of symbol values corresponds to symbol values of base 28 from 16 to 27.

7. At least one non-transitory computer readable medium comprising instructions, which, when executed, cause at least one processor to at least:
increment symbols of a watermark timestamp based on a first value of a key;
restrict ones of the symbols to increment over one of a first range of symbol values or a second range of symbol values based on the first value of the key, the second range of symbol values different from the first range of symbol values;
determine whether the symbols of the watermark timestamp have completed incrementing based on the first value of the key;
in response to a determination that the symbols of the watermark timestamp have completed incrementing based on the first value of the key, select a second value of the key; and
increment the symbols of the watermark timestamp based on the second value of the key; and
restrict ones of the symbols to increment over one of the first range of symbol values or the second range of symbol values based on the second value of the key.

8. The at least one non-transitory computer readable medium of claim 7, wherein the instructions, when executed, cause the at least one processor to:
increment first ones of the symbols restricted to the first range of symbol values based on the first value of the key;
after the first ones of the symbols have been incremented over the first range of symbol values, increment a second one of the symbols restricted to the second range of symbol values based on the first value of the key; and
after the second one of the symbols has been incremented, increment the first ones of the symbols over the first range of symbol values.

9. The at least one non-transitory computer readable medium of claim 7, wherein the instructions, when executed, cause the at least one processor to:
restrict, based on the first value of the key, a first set of the symbols of the watermark timestamp to increment over the first range of symbol values and a second set of the symbols to increment over the second range of symbol values; and
restrict, based on the second value of the key, a third set of the symbols to increment over the first range of symbol values and a fourth set of the symbols to increment over the second range of symbol values, the third set different from the first set and the fourth set different from the second set.

10. The at least one non-transitory computer readable medium of claim 7, wherein the instructions when executed, cause the at least one processor to:
generate the watermark timestamp based on the symbol values; and
output the watermark timestamp.

11. The at least one non-transitory computer readable medium of claim 7, wherein the instructions when executed, cause the at least one processor to embed the watermark timestamp into media.

12. At least one non-transitory computer readable medium comprising instructions, which, when executed, cause at least one processor to at least:
increment symbols of a watermark timestamp based on a key; and
restrict ones of the symbols to increment over one of a first range of symbol values or a second range of symbol values based on a value of the key, the second range of symbol values different from the first range of symbol values;
wherein the first range of symbol values corresponds to symbol values of base 16 from 0 to 15, and the second range of symbol values corresponds to symbol values of base 28 from 16 to 27.

13. An apparatus for watermark encoding, the apparatus comprising:
memory; and
at least one processor to implement:
a counter to increment symbols of a watermark timestamp; and
a controller to:
control the counter to increment the symbols of the watermark timestamp based on a first value of a key, the controller to cause the counter to restrict ones of the symbols to increment over one of a first range of symbol values or a second range of symbol values based on the first value of the key, the second range of symbol values different from the first range of symbol values;
determine whether the counter has completed incrementing the symbols of the watermark timestamp based on the first value of the key;
in response to a determination that the counter has completed incrementing the symbols of the watermark timestamp based on the first value of the key, select a second value of the key; and
control the counter to increment the symbols of the watermark timestamp based on the second value of the key, the controller to cause the counter to restrict ones of the symbols to increment over one of the first range of symbol values or the second range of symbol values based on the second value of the key.

14. The apparatus of claim 13, wherein the controller is to:
cause the counter to increment first ones of the symbols restricted to the first range of symbol values based on the first value of the key;
after the first ones of the symbols have been incremented over the first range of symbol values, increment a second one of the symbols restricted to the second range of symbol values based on the first value of the key; and
after the second one of the symbols has been incremented, increment the first ones of the symbols over the first range of symbol values.

15. The apparatus of claim 13, wherein the controller is to:
cause the counter to restrict, based on the first value of the key, a first set of the symbols of the watermark timestamp to increment over the first range of symbol values and a second set of the symbols to increment over the second range of symbol values; and
cause the counter to restrict, based on the second value of the key, a third set of the symbols to increment over the first range of symbol values and a fourth set of the symbols to increment over the second range of symbol values, the third set different from the first set and the fourth set different from the second set.

16. The apparatus of claim 13, wherein the controller is to:
generate the watermark timestamp based on the symbol values of the counter; and
output the watermark timestamp to a watermark embedder.

17. An apparatus comprising:
memory; and
at least one processor to implement:
a counter to increment symbols of a watermark timestamp; and
a controller to control the counter to increment the symbols of the watermark timestamp based on a key, the controller to cause the counter to restrict ones of symbols to increment over one of a first range of symbol values or a second range of symbol values based on a value of the key, the second range of symbol values different from the first range of symbol values, wherein the first range of symbol values corresponds to symbol values of base 16 from 0 to 15, and the second range of symbol values corresponds to symbol values of base 28 from 16 to 27.

* * * * *